United States Patent
Dubus et al.

(10) Patent No.: US 11,193,915 B2
(45) Date of Patent: Dec. 7, 2021

(54) COMPOSITE MATERIAL FOR THE DETECTION OF CHEMICAL SPECIES

(71) Applicant: INSTITUT NATIONAL D'OPTIQUE, Quebec (CA)

(72) Inventors: Sebastien Dubus, Quebec (CA); Serge Caron, Quebec (CA); Nolwenn Le Bouch, Quebec (CA); Antoine Proulx, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 294 days.

(21) Appl. No.: 15/779,031

(22) PCT Filed: Nov. 28, 2016

(86) PCT No.: PCT/CA2016/051399
§ 371 (c)(1),
(2) Date: May 24, 2018

(87) PCT Pub. No.: WO2017/088069
PCT Pub. Date: Jun. 1, 2017

(65) Prior Publication Data
US 2019/0017978 A1    Jan. 17, 2019

Related U.S. Application Data

(60) Provisional application No. 62/260,406, filed on Nov. 27, 2015.

(51) Int. Cl.
G01N 31/22    (2006.01)
G01N 21/78    (2006.01)
(Continued)

(52) U.S. Cl.
CPC .............. *G01N 31/22* (2013.01); *C08K 3/22* (2013.01); *C08K 3/36* (2013.01); *C08L 79/08* (2013.01);
(Continued)

(58) Field of Classification Search
CPC .......... G01N 31/22; G01N 21/78; C08K 3/22; C08K 3/36; C08K 5/357; C08K 5/55; C08L 79/08; C09B 19/00
(Continued)

(56) References Cited

U.S. PATENT DOCUMENTS 4,755,555 A * 7/1988 Manwiller ......... C08G 73/1028
524/607
6,592,764 B1 * 7/2003 Stucky .................. B01D 15/00
210/660
(Continued)

FOREIGN PATENT DOCUMENTS

WO    2014145745        9/2014
WO    WO-2015179725 A1 * 11/2015 ............. G01N 21/80

OTHER PUBLICATIONS

International Search Report and Written Opinion for PCT/CA2016/051399, dated Feb. 3, 2017, 11 Pages.
(Continued)

*Primary Examiner* — Matthew D Krcha
*Assistant Examiner* — Jacqueline Brazin
(74) *Attorney, Agent, or Firm* — Brooks Kushman P.C.

(57) ABSTRACT

A composite material for sensing a chemical species in a medium is provided. The composite material includes a polymer having a glass transition temperature, a porosity promoter dispersed in the polymer in an amount such that the chemical species is transportable from the medium into the composite material at a temperature below the glass transition temperature, and a chemical indicator dispersed in
(Continued)

the composite material, the chemical indicator providing an optical response varying with a concentration of the chemical species in the composite material.

19 Claims, 4 Drawing Sheets

(51) Int. Cl.
| | |
|---|---|
| *C09B 19/00* | (2006.01) |
| *C08L 79/08* | (2006.01) |
| *C08K 3/36* | (2006.01) |
| *C08K 3/22* | (2006.01) |
| *C08K 5/357* | (2006.01) |
| *C08K 5/55* | (2006.01) |

(52) U.S. Cl.
CPC ............. *C09B 19/00* (2013.01); *G01N 21/78* (2013.01); *C08K 5/357* (2013.01); *C08K 5/55* (2013.01); *C08K 2003/2227* (2013.01)

(58) Field of Classification Search
USPC .......................................................... 436/166
See application file for complete search history.

(56) References Cited

U.S. PATENT DOCUMENTS

| | | | | |
|---|---|---|---|---|
| 2002/0065366 | A1* | 5/2002 | Wirnsberger | ....... C04B 38/0022 525/88 |
| 2005/0040377 | A1* | 2/2005 | Drotleff | ............... G02B 6/1221 252/586 |
| 2006/0240560 | A1* | 10/2006 | Bakker | ............. G01N 33/6872 436/84 |
| 2011/0213075 | A1* | 9/2011 | Goshima | ............ C08G 73/1042 524/588 |

OTHER PUBLICATIONS

Siao, Ya-Yu et al., "Orderly arranged NLO materials on exfoliated layered templates based on dendrons with alternating moieties at the periphery," Polymer Chemistry 2013, vol. 4, No. 9, pp. 2747-2759.
Qiu, F.X. et al., "Synthesis, characterizations and electro-optical properties of nonlinear optical polyimide/silica hybrid", eXPRESS Polymer Letters 2007, vol. 1, No. 3, pp. 150-156.
Cheng, C-F et al., "Effect of Reactive Channel Functional Groups and Nanoporosity of Nanoscale Mesoporous Silica on Properties of Polyimide Composite", Macromolecules 2006, vol. 39, No. 22, pp. 7583-7590.
Scarpaci, A et al., "Synthesis and Nonlinear Optical Properties of a Peripherally Functionalized Hyperbranched Polymer by DR1 Chromophores", ACS Applied Materials & Interfaces 2009, vol. 1, No. 8, pp. 1799-1806.
Qu, L. et al., "Polymide-Functionalized Carbon Nanotubes: Synthesis and Dispersion in Nanocomposite Films", Macromolecules, 2004, vol. 37, pp. 6055-6060.

* cited by examiner

COMPOSITE MATERIAL FOR THE DETECTION OF CHEMICAL SPECIES

CROSS-REFERENCE TO RELATED APPLICATION

This application is the U.S. national phase of PCT Application No. PCT/CA2016/051399 filed on Nov. 28, 2016, which claims the benefit of U.S. Provisional Application No. 62/260,406 filed on Nov. 27, 2015, the disclosures of which are incorporated in their entirety by reference herein.

FIELD

The technical field generally relates to chemical sensors, and more particularly to composite materials for the optical detection of chemical species.

BACKGROUND

Chemical sensors are used in many applications, including industrial, biomedical and clinical applications. Industrial applications include environmental emission control, agricultural industry, oil industry and food industry. Examples of biomedical and clinical applications include determination of the pH or the presence of specific ions, oxygen, alcohol or other components of interest, in a sample.

Several chemical sensors which make use of polymer membranes or films are known in the art. The analyte to be detected is typically transported from the medium to be analyzed into the polymer membrane. The presence of the analyte inside the polymer membrane typically changes the optical response of the polymer membrane, and the analysis of the optical properties of the polymer membrane therefore provides an indication on the presence of the analyte in the medium to be analyzed.

One limitation of existing polymer membranes is that the temperature of operation is limited by the glass transition temperature of the polymer. More specifically, at temperatures below the glass transition temperature, the polymer is in a vitreous state and the analyte cannot permeate through the membrane. Furthermore, when the temperature increases to a certain point beyond the glass transition temperature, the polymer typically loses its mechanical properties, and the mechanical cohesion of the membrane is no longer sufficient to function as a chemical sensor.

In view of the above, many challenges still exist in the field of chemical sensors based on polymer materials.

SUMMARY

In one general aspect, there is provided a composite material for sensing a chemical species in a medium, the composite material including:
- a polymer having a glass transition temperature (Tg);
- a porosity promoter dispersed in the polymer in an amount such that the chemical species is transportable from the medium into the composite material at a temperature below the Tg; and
- a chemical indicator dispersed in the composite material, the chemical indicator providing an optical response varying with a concentration of the chemical species in the composite material.

In another aspect, there is provided a composite material for sensing cations solvated in a solution, the composite material including:
- a polymer material having a glass transition temperature (Tg);
- a porosity promoter which is an unfunctionalized mesoporous oxide, the porosity promoter being dispersed in the polymer in an amount such that the cation is transportable from the solution into the composite material at a temperature below the Tg; and
- a chemical indicator including an ionic additive, a chromoionophore and an ion-selective ionophore, the chemical indicator being dispersed in the composite material and providing an optical response varying as a function of a concentration of the chemical species in the composite material,
- wherein the wherein the chemical indicator includes at least 130 nmol of ionic additive per square meter specific surface area (SSA) of the porosity promoter, and
- wherein the ratio polymer/porosity promoter is between 80/20 and 50/50 (w/w).

In yet another aspect, there is provided a composite material for sensing cations solvated in a solution, the composite material including:
- a polymer material of formula I, Ia, Ib, Ic or Id as defined herein;
- a porosity promoter which is an unfunctionalized mesoporous oxide, the porosity promoter being dispersed in the polymer; and
- a chemical indicator including an ionic additive, a chromoionophore and an ion-selective ionophore, the chemical indicator being dispersed in the composite material and providing an optical response varying as a function of a concentration of the chemical species in the composite material,
- wherein the wherein the chemical indicator includes at least 130 nmol of ionic additive per square meter specific surface area (SSA) of the porosity promoter, and
- wherein the ratio polymer/porosity promoter is between 80/20 and 50/50 (w/w).

In some embodiments, the medium is a liquid and the chemical species is solvated in the liquid.

In some embodiments, the chemical species is an ion.

In some embodiments, the ion is a cation.

In some embodiments, the porosity promoter is substantially non-reactive to the polymer.

In some embodiments, the Tg is higher than 150° C.

In some embodiments, the polymer includes a polyimide, a polyether ketone, a polyacrylate, a poly-etherimide, a polyacrylamide, a polyamide-imide, a polysulfone, a polyethersulfone, a polynorbornene, a polyurethane, or a blend thereof.

In some embodiments, the polymer includes a polyimide of general formula I:

wherein:

A is a tetravalent linker, which is:

a substituted or unsubstituted, saturated, unsaturated or aromatic monocyclic or polycyclic group having 5 to about 50 carbon atoms; or a group of general formula:

wherein:

each $A_1$ is independently a substituted or unsubstituted, saturated, unsaturated or aromatic monocyclic or polycyclic group having 5 to about 50 carbon atoms, and W is a bond, —O—, —$CR_3R_4$—, —$NR_5$—, —S—, —(CO)—, arylene, or substituted arylene; and Z is —$(CR_3R_4)_m$—, arylene, or substituted arylene; or Z is of general formula:

wherein:

each $Z_1$ is independently arylene or substituted arylene;

each X is independently a bond, —O—, —$CR_3R_4$—, —$NR_5$—, —S—, —(CO)—, arylene, or substituted arylene;

each $R_3$, $R_4$ and $R_5$ is independently: H, a ($C_1$-$C_4$)alkyl or a substituted ($C_1$-$C_4$)alkyl;

p is from 1 to 16; and n is from 1 to 16.

In some embodiments, A is:

wherein W is a bond, —O—, —$CR_3R_4$—, —$NR_5$—, —S—, —(CO)—, arylene, or substituted arylene.

In some embodiments, Z is:

wherein X is a bond, —O—, —$CR_3R_4$—, —$NR_5$—, —S—, —(CO)—, arylene, or substituted arylene; and n is from 1 to 4.

In some embodiments, the polymer includes a polyimide of general formula (Ia):

(Ia)

wherein:

each X is independently: —O—, —$CR_3R_4$—, —$NR_5$—, S, arylene, or substituted arylene;

n is 1, 2, 3 or 4; and each $R_1$, $R_2$, $R_3$, $R_4$ or $R_5$ is independently: H, a ($C_1$-$C_4$) alkyl or a substituted ($C_1$-$C_4$)alkyl.

In some embodiments, the arylene is para-phenylene.

In some embodiments, each X is independently —O— or —$CR_3R_4$—.

In some embodiments, n is 1, 2 or 3.

In some embodiments, each $R_1$, $R_2$, $R_3$ or $R_4$ is independently: H, a ($C_1$-$C_4$)alkyl or a ($C_1$-$C_4$)haloalkyl.

In some embodiments, each $R_1$, $R_2$, $R_3$ or $R_4$ is independently a ($C_1$-$C_4$)perfluoroalkyl.

In some embodiments, each $R_1$, $R_2$, $R_3$ or $R_4$ is $CF_3$.

In some embodiments, the polymer includes a polyimide of general formula (Ia):

(Ib)

wherein:

each X is independently: —O— or —$CR_3R_4$—;

n is 1, 2 or 3; and

$R_3$ and $R_4$ are $CF_3$.

In some embodiments, the polymer includes a polyimide of Formula (Ib):

(Ic)

In some embodiments, the polymer includes a polyimide of Formula (Ic):

In some embodiments, the porosity promoter includes a mesoporous material.

In some embodiments, the mesoporous material includes a mesoporous oxide.

In some embodiments, the mesoporous oxide includes mesoporous silica, mesoporous alumina, a mesoporous oxide of niobium, a mesoporous oxide of tantalum, a mesoporous oxide of titanium, a mesoporous oxide of zirconium, a mesoporous oxide of cerium, a mesoporous oxide of tin or a mixture thereof.

In some embodiments, the mesoporous oxide includes mesoporous silica, mesoporous alumina, or a mixture thereof.

In some embodiments, the mesoporous oxide is unfunctionalized.

In some embodiments, the mesoporous oxide includes MCM-41, SBA-15, MSU, KSW, FSM, HMM or a mixture thereof.

In some embodiments, the porosity promoter and the polymer are present in the composite material in a ratio polymer/porosity promoter between 95/5 and 50/50 (w/w).

In some embodiments, the porosity promoter and the polymer are present in the composite material in a ratio polymer/porosity promoter between 90/10 and 50/50 (w/w).

In some embodiments, the porosity promoter and the polymer are present in the composite material in a ratio polymer/porosity promoter between 80/20 and 50/50 (w/w).

In some embodiments, the ratio polymer/porosity promoter is between 70/30 and 50/50 (w/w).

In some embodiments, the ratio polymer/porosity promoter is between 70/30 and 60/40 (w/w).

In some embodiments, the ratio polymer/porosity promoter is between 80/20 and 60/40 (w/w).

In some embodiments, the ratio polymer/porosity promoter is between 80/20 and 70/30 (w/w).

In some embodiments, the chemical indicator includes an ionic additive.

In some embodiments, the ionic additive includes Sodium tetrakis[3,5-bis(trifluoro)phenyl]borate (NaTFPB), potassium tetrakis[3,5-bis(trifluoromethyl)phenyl]borate, sodium tetrakis[3,5-bis(1,1,1,3,3,3-hexafluoro-2-methoxy-2-propyl)phenyl]borate trihydrate, potassium tetrakis(4-chlorophenyl)borate, potassium tetrakis(4-biphenylyl)borate, potassium tetrakis(4-tert-butylphenyl)borate, sodium tetra(p-tolyl)borate, sodium tetrakis(4-fluorophenyl)borate dihydrate, sodium tetraphenylborate, tetradodecylammonium tetrakis(4-chlorophenyl)borate, tetraheptylammonium tetraphenylborate, tetraphenylphosphonium tetraphenylborate, sodium tetrakis[3,5-bis(tridecafluorohexyl)phenyl]borate, 1,2-dimethyl-3-nitrobenzene, dimethyldioctadecylammonium bromide, tridodecylmethylammonium chloride, tetraoctylammonium bromide, tetraoctadecylammonium bromide, hexadecyltrimethylammonium bromide, tridodecylmethylammonium nitrate, or a mixture thereof.

In some embodiments, the chemical indicator includes at least 130 nmol of ionic additive per square meter specific surface area (SSA) of the porosity promoter.

In some embodiments, the chemical indicator includes between 130 nmol and 270 nmol of ionic additive per square meter SSA of the porosity promoter.

In some embodiments, the chemical indicator includes a chromoionophore.

In some embodiments, the chromoionophore includes chromoionophore-I, chromoionophore-II, chromoionophore-III, chromoionophore-IV, chromoionophore-V, chromoionophore-VI, chromoionophore-VII, chromoionophore-VIII, chromoionophore-IX, chromoionophore-X, chromoionophore-XI, chromoionophore-XVII, 10-[3-(dansylamino)propyl]-1,4,7-trithia-10-azacyclododecane, 4-(dioctylamino)-4'-(trifluoroacetyl)azobenzene, 7-[3-(dansylamino)propyl]-1-oxa-4,10-dithia-7azacyclododecane or octadecyl2-(4-dipropylaminophenylazo)benzoate.

In some embodiments, the chemical indicator includes an ion-selective ionophore.

In some embodiments, the ion-selective ionophore includes aluminium ionophore-I, ammonium ionophore-I, cadmium ionophore-I, calcium ionophore-I, calcium ionophore-II, -calcium ionophore-III, calcium ionophore-IV, calcium ionophore-V, calcium ionophore-VI, cerium(III) ionophore-I, cesium ionophore-I, cesium ionophore-II, cesium ionophore-III, chromium(III) ionophore-III, chromium(IV) ionophore-III, cobalt ionophore-IV, copper(II) ionophore-I, copper(II) ionophore-IV, copper(II) ionophore-V, erbium ionophore-IV, hydrogen ionophore-I, hydrogen ionophore-II, hydrogen ionophore-III, hydrogen ionophore-IV, hydrogen ionophore-V, Iron(III) ionophore-IV, lead ionophore-I, lead ionophore-II, lead ionophore-III, lead ionophore-IV, lead ionophore-VII, lithium ionophore-I, lithium ionophore-II, lithium ionophore-III, lithium ionophore-IV, lithium ionophore-VI, lithium ionophore-VII, lithium ionophore-VIII, magnesium ionophore-I, magnesium ionophore-II, magnesium ionophore-III, magnesium ionophore-IV, magnesium ionophore-VI, magnesium ionophore-VII, mercury ionophore-I, potassium ionophore-I, potassium ionophore-II, potassium ionophore-III, potassium ionophore-IV, rubidium ionophore-I, samarium ionophore-I, samarium ionophore-II, silver ionophore-III, silver ionophore-IV, silver ionophore-VI, silver ionophore-VII, sodium ionophore-I, sodium ionophore-II, sodium ionophore-III, sodium ionophore-IV, sodium ionophore-V, sodium ionophore-VI, sodium ionophore-VIII, sodium ionophore-X, thulium ionophore-I, tin ionophore-I, uranyl ionophore-I, ytterbium(III) ionophore-II, zinc ionophore-I, zirconium ionophore-I, benzoate ionophore-I, carbonate ionophore-VII, chloride ionophore-I, chloride ionophore-II, chloride ionophore-III, chloride ionophore-IV, cyanide ionophore-II, fluoride ionophore-I, hydrogen sulfite ionophore-I, iodide ionophore-I, iodide ionophore-IV, molybdate ionophore-I, nitrate ionophore-III, nitrate ionophore-V, nitrate ionophore-VI, nitrite ionophore-I, nitrite ionophore-II, perchlorate ionophore-I, phtalate ionophore-I, salicylate ionophore-I, salicylate ionophore-II, sulfate ionophore-I, or amine ionophore-I.

In some embodiments, the optical response includes a change in the perceivable color of the composite material upon exposure to the chemical species.

In some embodiments, the optical response includes a change in refractive index or a change in absorption, reflection or emission spectrum of the composite material upon exposure to the chemical species.

In some embodiments, there is provided the use of the composite material in a chemical sensor.

In some embodiments, the chemical sensor is an ion-selective sensor.

In some embodiments, the ion-selective sensor is a cation-selective sensor.

In some embodiments, the chemical sensor is an optical fiber chemical sensor.

In some embodiments, the composite material is a sensing cladding surrounding a core of the optical fiber.

DETAILED DESCRIPTION

The materials described herein are embodiments of a composite material which can be used in chemical sensors. More specifically, the composite material can be used for the optical detection of chemical species in a medium.

Generally, the composite material, according to embodiments of the present description, first includes a polymer having a glass transition temperature (Tg). The composite material also includes a porosity promoter dispersed in the polymer in an amount such that the chemical species is transportable from the medium into the composite material at a temperature below the Tg. The composite material further includes a chemical indicator which is dispersed in the composite material. The chemical indicator provides an optical response which depends on the concentration of the chemical species in the composite material.

The composite material described herein may generally be useful in any application where it is desired to detect a chemical species in a medium, or determine the concentration of a chemical species in a medium. The detection or concentration measurement may be selective to a specific chemical species. By way of example, embodiments of the composite material may take the form of a membrane or a film, which may be used in the detection/concentration measurement of ions in solution for industrial applications such as environmental emission control, agricultural and food industries, and in the biomedical field. Embodiments of the composite material may also be used in applications requiring sensing of a target compound in adverse environmental conditions.

The "glass transition temperature" or "Tg" of the polymer, as commonly defined in polymer science, refers to a temperature within a glass transition range at which a metastable melt of the polymer transforms into an amorphous material in the course of its cooling, and at which amorphous regions of the polymer transform into a metastable melt in the course of its heating. It is understood that the Tg, as referred to herein, can be measured by differential scanning calorimetry (DSC) using the "Standard Test Method for Assignment of the Glass Transition Temperatures by Differential Scanning calorimetry" (ASTM E1356-08). It is also understood that the extrapolated onset temperature Tf can be used as the measured value for Tg, wherein Tf is the point of intersection of the tangent drawn at the point of greatest slope on the DSC transition curve with the extrapolated baseline prior to the glass transition.

In some embodiments, the chemical species is not only transportable from the medium into the composite material at temperatures below the Tg, but is also transportable at temperatures above the Tg. In some scenarios, the chemical species is transportable at such temperatures above the Tg, up to temperatures at which the composite material loses its mechanical integrity. In other words, the composite material may allow for a detection of chemical species over a wide range of temperatures, including below the Tg, around the Tg and above the Tg, the upper limit of this range being determined by the loss of mechanical properties of the composite material.

In some embodiments, the polymer used in the composite material is selected such that the Tg of the polymer is of at least 150° C., at least 200° C. or at least 250° C. Selecting a polymer which has a high Tg can be desirable in some applications, for example for detecting chemical species in certain adverse environmental conditions. In some embodiments, the polymer is substantially non-reactive to the porosity promoter. By "substantially non-reactive", it is meant that the polymer and the porosity promoter do not engage in chemical reactions which would deactivate them or otherwise modify their chemical structure, at the operating temperatures at which the optical detection is performed. However, it is understood that the polymer and the porosity promoter may, in some instances, engage in non-covalent interactions.

In some embodiments, the medium may be a gas mixture such as air, an industrial gaseous mixture such as flue gas, or a gaseous reaction mixture. In such case, the chemical species is a gas molecule present in the gas mixture. In other embodiments, the medium may be a liquid and the chemical species is a solvated ion or molecule. It should be understood that the term "liquid" may refer to a solution, such as an aqueous solution, a solvent or mixture of solvents (e.g. an organic solvent), and may also refer to a liquid which is absorbed or otherwise impregnated in a solid sample. Examples of solid samples include soil samples or gels which can be impregnated with liquid. In some embodiments, the medium (liquid or gas) may be pressurized. For example, the liquid can be a pressurized aqueous solution. In such case, the composite material can be used at temperatures up to the boiling temperature of the water at the given pressure, provided that the temperature is below the temperature at which the composite material loses its mechanical properties, and below the degradation temperature of the compounds forming the composite material.

In some embodiments, the polymer used in the composite material is a thermoplastic polymer, and/or can be prepared from either plasticized or plasticizer-free polymer(s). In some embodiments, the polymer includes an organic polymer, such as a polyimide, a polyether ketone, a polyacrylate, a poly-etherimide, a polyacrylamide, a polyamide-imide, a polysulfone, a polyethersulfone, a polynorbornene, a polyurethane, or a blend thereof. In some embodiments, the polymer includes a fluorinated polymer. In some embodiments, the fluorinated polymer includes a fluorinated polyimide.

In some embodiments, the polymer includes a polyimide of general formula (I):

(I)

wherein:
A is a tetravalent linker, which is:
a substituted or unsubstituted, saturated, unsaturated or aromatic monocyclic or polycyclic group having 5 to about 50 carbon atoms; or
a group of general formula:

wherein:
each $A_1$ is independently a substituted or unsubstituted, saturated, unsaturated or aromatic monocyclic or polycyclic group having 5 to about 50 carbon atoms, and
W is a bond, —O—, —$CR_3R_4$—, —$NR_5$—S—, —(CO)—, arylene, or substituted arylene; and
Z is —$(CR_3R_4)_m$—, arylene, or substituted arylene; or Z is of general formula:

—(—$Z_1$—X—)$_n$—$Z_1$—, wherein:
each $Z_1$ is independently arylene or substituted arylene;
each X is independently a bond, —O—, —$CR_3R_4$—, —$NR_5$—, —S—, —(CO)—, arylene, or substituted arylene;
each $R_3$, $R_4$ and $R_5$ is independently: H, a ($C_1$-$C_4$) alkyl or a substituted ($C_1$-$C_4$)alkyl;
m is from 1 to 16; and
n is from 1 to 16.

In some embodiments, A is:

,  or wherein W is a bond, —O—, —$CR_3R_4$—, —$NR_5$—, —S—, —(CO)—, arylene, or substituted arylene.

In some embodiments, Z is:

wherein X is a bond, —O—, —$CR_3R_4$—, —$NR_5$—, —S—, —(CO)—, arylene, or substituted arylene; and
n is from 1 to 4.

In some embodiments, the polymer includes a polyimide of general formula (Ia):

(Ia)

wherein:
each X is independently: a bond, —O—, —$CR_3R_4$—, —$NR_5$—S—, —(CO)—, arylene, or substituted arylene;
n is 1, 2, 3 or 4; and
each $R_1$, $R_2$, $R_3$, $R_4$ or $R_5$ is independently: H, a ($C_1$-$C_4$) alkyl or a substituted ($C_1$-$C_4$)alkyl.

In some embodiments, the arylene is para-phenylene.
In some embodiments, each X is independently —O— or —$CR_3R_4$—.
In some embodiments, n is 1, 2 or 3.
In some embodiments, each $R_1$, $R_2$, $R_3$ or $R_4$ is independently: H, a ($C_1$-$C_4$)alkyl or a ($C_1$-$C_4$)haloalkyl.
In some embodiments, each $R_1$, $R_2$, $R_3$ or $R_4$ is independently a ($C_1$-$C_4$)perfluoroalkyl.
In some embodiments, each $R_1$, $R_2$, $R_3$ or $R_4$ is $CF_3$.
In some embodiments, the polymer includes a polyimide of general formula (Ib):

(Ib)

wherein:
each X is independently: —O— or —$CR_3R_4$—;
n is 1, 2 or 3; and
$R_3$ and $R_4$ are $CF_3$.

In some embodiments, the polymer includes a polyimide of Formula (Ic):

(Ic)

In some embodiments, the polymer includes a polyimide of Formula (Id):

(Id)

The term "arylene", as used herein, refers to a divalent aromatic substituent containing a single aromatic ring or multiple aromatic rings which are fused together or linked covalently. In some embodiments, the arylene groups contain one aromatic ring or two fused or linked aromatic rings. "Substituted arylene" refers to an arylene moiety substituted with one or more substituent groups.

The term "$(C_1-C_4)$" in "$(C_1-C_4)$alkyl", "$(C_1-C_4)$haloalkyl" and "$(C_1-C_4)$perfluoroalkyl", as used herein, refers to groups which have 1, 2, 3 or 4 carbon atoms. For example, $(C_1-C_4)$alkyl groups (also referred to as "lower alkyl" groups) include methyl, ethyl, n-propyl, isopropyl, n-butyl, s-butyl, isobutyl and t-butyl groups.

By "substituted" in "substituted $(C_1-C_4)$alkyl" or "substituted arylene", it is meant that in the $(C_1-C_4)$alkyl or the arylene, at least one hydrogen atom bound to a carbon atom is replaced with one or more substituents that are functional groups such as hydroxyl, alkoxy, thio, amino, halo, among others.

The terms "halo" and "halogen" are used in the conventional sense to refer to a chloro, bromo, fluoro or iodo substituent. The terms "haloalkyl," refers to an alkyl in which at least one of the hydrogen atoms has been replaced with a halogen atom. The term "perfluoroalkyl" refers to an alkyl in which all of the hydrogen atoms have been replaced with fluoro substituents.

As mentioned above, the composite material further includes a porosity promoter dispersed in the polymer in an amount such that the chemical species is transportable from the medium into the composite material at a temperature below the Tg. In other words, dispersing the porosity promoter in the polymer allows to increase the porosity of the composite material at temperatures below the Tg of the polymer, such that the chemical species to be detected is able to migrate into the composite material. The transport of chemical species into the composite material is based on a chemical equilibrium which will be described in further detail below.

At temperatures lower than the Tg, with no or very low amount of dispersed porosity promoter, the composite material may not respond to stimuli. With an increase of the amount of dispersed porosity promoter, the composite material can become porous enough to allow gas molecules, such as gaseous acids (e.g. HCl) and gaseous bases (e.g. $NH_3$), to be transported. By further increasing the amount of dispersed porosity promoter, the composite material can become porous enough to allow solvated chemical species to be transported. The solvated chemical species can include cations, anions or small molecules. For example, the solvated chemical species can include protons, cations such as alkali ions, alkali-earth ions, or transition metal ions, or anions such as halogen ions, polyatomic ions and organic ions. The solvated chemical species can also include small solvated organic molecules.

It is understood that the term "dispersed", as used herein, refers to distributing the porosity promoter in the polymer. In other words, dispersing the porosity promoter in the polymer means that the porosity promoter is mixed with and spread (evenly or not) throughout the polymer. In some scenarios, the porosity promoter is dispersed in the polymer by solubilizing the polymer into a solvent and solubilizing or suspending the porosity promoter into the solvent, and then removing the solvent. The solvent can be removed by evaporation under vacuum, or by heating. In some scenarios, the porosity promoter is dispersed in the polymer by melting the polymer and directly solubilizing or suspending the porosity promoter into the melted polymer, before cooling the mixture obtained. It is understood that other means for dispersing the porosity promoter in the polymer may be used. It should also be understood that the term "dispersed" is taken to have the same meaning for other components of the composite material, such as the chemical indicator, which is dispersed in the composite material. It should also be understood that the term "dispersed" does not limit in any way the order of addition or dispersion of each component of the composite material. In other words, the polymer, porosity promoter and each separate component of the chemical indicator can be mixed sequentially and dispersed in any order or together in one single step.

In some embodiments, the porosity promoter includes a mesoporous material. The term "mesoporous material", as used herein, refers to a material containing pores with diameters between 2 and 50 nm. The mesoporous material may be disordered or ordered in a mesostructure. In some embodiments, the mesoporous material includes a mesoporous oxide. Examples of mesoporous oxides include mesoporous silica, mesoporous alumina, a mesoporous oxide of niobium, a mesoporous oxide of tantalum, a mesoporous oxide of titanium, a mesoporous oxide of zirconium, a mesoporous oxide of cerium, a mesoporous oxide of tin, or a mixture thereof. In some embodiments, the mesoporous silica includes MCM-41, SBA-15, MSU, KSW, FSM, HMM or a mixture thereof. It is understood that other grades and types of mesoporous silica can be used in the composite material.

The mesoporous oxide can be functionalized or unfunctionalized. In some scenarios, using an unfunctionalized mesoporous oxide, such as unfunctionalized mesoporous silica, can increase the interactions with cationic chemical species to detect. Similarly, in other scenarios, using a mesoporous oxide which is functionalized by a group bearing a positive charge or having an affinity with anions can increase the interactions with anionic chemical species to be detected. In some scenarios, using a mesoporous oxide which is functionalized with hydrophobic groups can increase the interactions with small organic molecules or apolar gaseous species. In some embodiments, the type of mesoporous oxide is selected so as to optimize the interactions between the mesoporous oxide and the chemical species to detect, thereby facilitating the transport.

The ratio polymer/porosity promoter can allow for a tuning of the porosity of the composite material, in a temperature range of interest below the Tg. The porosity can be tuned to a value which is suitable to allow the chemical species to be transported, while retaining selectivity of the composite material. In other words, depending on the chemical species to be detected, the porosity of the composite material can be set to be large enough to allow the chemical species to be transported via chemical equilibrium, but small enough to prevent various compounds and species from migrating in the composite material by means of a diffusion-driven mechanism. Depending on the polymer, the amount of porosity promoter which can be added can also be limited by the mechanical properties of the composite material, which can become brittle if too much porosity promoter is dispersed in the polymer. In some embodiments, the ratio polymer/porosity promoter is between 95/5 and 50/50 (w/w), between 98/2 and 50/50 (w/w), between 90/10 and 50/50 (w/w), between 80/20 and 50/50 (w/w), between 80/20 and 70/30 (w/w), between 80/20 and 60/40 (w/w), between 70/30 and 50/50 (w/w), or between 70/30 and 60/40 (w/w).

As mentioned above, the composite material further includes a chemical indicator dispersed in the composite material. The chemical indicator provides an optical response which can vary with the concentration of the chemical species in the composite material. The chemical indicator can directly or indirectly provide the optical response to a given chemical species or to several chemical species. Direct sensitivity (or direct detection) refers to a chemical indicator which is directly in a chemical equilibrium with the analyte. An example of a direct detection is a pH indicator for sensing protons solvated in a solution. Indirect sensitivity (or indirect detection) refers to equilibrium between the chemical indicator and the analyte which is carried on by several chemical equilibriums between other chemical intermediates, as detailed below. An example of indirect sensitivity is the indirect detection of sodium ions or calcium ions solvated in a solution.

In some embodiments, the chemical indicator includes an ionic additive (or ionic sites) R when the chemical species to be detected is an anion or a cation. The ionic additive provides electroneutrality by ensuring charge conservation in the composite material. The ionic additive R allows for an ionic exchange, provided that the composite material is selective with regard to the ion to be detected. The ionic additive can be selected to have a bulky anion or cation which remains in the composite material, the bulky anion or cation being paired with an exchangeable counterion.

In some embodiments, when the chemical species to be detected is a cation, the ionic additive can include a bulky anion, or a weakly coordinating anion, such as tetrakis[3,5-bis(trifluoro)phenyl]borate, hexafluorophosphate, tetrafluoroborate, perchlorate $Al(OC(CF_3)_3)_4^-$, or $B(C_6F_5)_3^-$, tetrakis[3,5-bis(1,1,1,3,3,3-hexafluoro-2-methoxy-2-propyl)phenyl]borate trihydrate, tetrakis(4-chlorophenyl)borate, tetrakis(4-biphenylyl)borate, tetrakis(4-tert-butylphenyl)borate, tetra(p-tolyl)borate, tetrakis(4-fluorophenyl)borate dihydrate, tetraphenylborate, tetraphenylborate, tetrakis[3,5-bis(tridecafluorohexyl)phenyl]borate or a mixture thereof. Examples of ionic additives include sodium, potassium, calcium salts of the anions mentioned above. Other examples of ionic additives can include potassium tetrakis[3,5-bis(trifluoromethyl)phenyl]borate, sodium tetrakis[3,5-bis(1,1,1,3,3,3-hexafluoro-2-methoxy-2-propyl)phenyl]borate trihydrate, potassium tetrakis(4-chlorophenyl)borate, potassium tetrakis(4-biphenylyl)borate, Potassium tetrakis(4-tert-butylphenyl)borate, sodium tetra(p-tolyl)borate, sodium tetrakis(4-fluorophenyl)borate dihydrate, sodium tetraphenylborate, tetradodecylammonium tetrakis(4-chlorophenyl)borate, tetraheptylammonium tetraphenylborate, Tetraphenylphosphonium tetraphenylborate, sodium tetrakis[3,5-bis(tridecafluorohexyl)phenyl]borate, 1,2-dimethyl-3-nitrobenzene, dimethyldioctadecylammonium bromide, tridodecylmethylammonium chloride, tetraoctylammonium bromide, tetraoctadecylammonium bromide, hexadecyltrimethylammonium bromide, tridodecylmethylammonium nitrate, or a mixture thereof.

In certain scenarios when the porosity promoter is an unfunctionalized mesoporous oxide and the chemical species to be detected is a cation, it has been surprisingly found that the activity of the ionic additive was reduced to some extent. Without being bound to theory, it has been hypothesized that some of the exchangeable counterions of the ionic additive can interact with the oxygen atoms of the mesoporous oxide, thereby reducing the effective concentration of the ionic additive, which can effectively reduce the exchange rate with the cation to be detected. More ionic additive can be added to overcome this reduced activity. In some embodiments, the chemical indicator includes at least 130 nmol, or between 130 nmol and 270 nmol of ionic additive per square meter specific surface area (SSA) of the unfunctionalized porosity promoter. As a comparison point, it has been found that about 70 nmol of ionic additive per square meter SSA of the unfunctionalized porosity promoter can be sufficient for the transport of uncharged gaseous molecules into the composite material.

In some embodiments, the chemical indicator includes a chromoionophore C which can provide the optical response of the composite material. It is to be noted that the chromoionophore can be omitted in the instance that the chemical species to be detected can provide an optical response by itself (e.g. for detecting bromide anions, a red coloration can be observed without the need to use a chromoionophore). In some embodiments, the chemical indicator includes an ion-selective ionophore L which can provide chemical selectivity.

Taking the example of the detection of a cation, the composite material is based on a reversible chemical equilibrium between cations M+ to be detected, present in solution, and protons in the composite material. The chemical equilibrium can be as follows:

$$nL(m) + CH^+(m) + R^-(m) + M^+(aq) \xrightleftharpoons{K} C(m) + [ML_n]^+(m) + H^+(aq) + R^-(m).$$

wherein:
- n is the stoichiometry of the ion-selective ionophore complex $[ML_n]^+$;
- (m) means that the substance is in the composite material, and (aq) means that the substance is in solution; and
- K is the chemical equilibrium constant.

This ionic exchange directly affects the equilibrium between the protonated state $CH^+$ of the chromoionophore, and the deprotonated state C of the chromoionophore. Since $CH^+$ and C have different optical responses, a change in their relative concentrations can be quantified using optical detection means. The relative concentration of the deprotonated state is referred to as the degree of deprotonation α or (1−x), and is given by:

$$1 - x = \frac{[C]}{[C] + [CH^+]}$$

The degree of deprotonation (1−x) is related to the concentration—or, to be exact, to the activity—of the targeted ion present in the material. This relation depends on the chemical equilibriums in the composite material, and can be determined by known methods. In some embodiments, the chromoionophore C includes chromoionophore-I, chromoionophore-II, chromoionophore-III, chromoionophore-IV, chromoionophore-V, chromoionophore-VI, chromoionophore-VII, chromoionophore-VIII, chromoionophore-IX, chromoionophore-X, chromoionophore-XI, chromoionophore-XVII, 10-[3-(dansylamino)propyl]-1,4,7-trithia-10-azacyclododecane, 4-(dioctylamino)-4'-(trifluoroacetyl) azobenzene, 7-[3-(dansylamino)propyl]-1-oxa-4,10-dithia-7azacyclododecane or octadecyl2-(4-dipropylaminophenylazo)benzoate. The commercial product name can also be spelled without the hyphen such as chromoionophore, chromoionophore II, chromoionophore III, chromoionophore IV, chromoionophore V, chromoionophore VI, chromoionophore VII, chromoionophore VIII, chromoionophore IX, chromoionophore X, chromoionophore XI, chromoionophore XVII. The chemical names are indicated in the table below:

| Chromoionophore | Chemical names |
| --- | --- |
| Chromoionophore I | 9-(Diethylamino)-5-(octadecanoylimino)-5H-benzo[α]phenoxazine or ETH 5294 |
| Chromoionophore II | 9-Dimethylamino-5-[4-(16-butyl-2,14-dioxo-3,15-dioxaeicosyl)phenylimino]benzo[a]phenoxazine or ETH 2439 |
| Chromoionophore III | 9-(Diethylamino)-5-[(2-octyldecyl)imino]benzo[a]phenoxazine or ETH 5350 |

-continued

| Chromoionophore | Chemical names |
| --- | --- |
| Chromoionophore IV | 5-Octadecanoyloxy-2-(4-nitrophenylazo)phenol or ETH 2412 |
| Chromoionophore V | 9-(Diethylamino)-5-(2-naphthoylimino)-5H-benzo[a]phenoxazine |

-continued

| Chromoionophore | Chemical names |
| --- | --- |
| Chromoionophore VI | 4',5'-Dibromofluorescein octadecyl ester or ETH 7075 |
| Chromoionophore VII | 9-Dimethylamino-5[4-(15-butyl-1,13-dioxo-2,14-dioxanonadecyl)phenylimino]benzo[a]phenoxazine or ETH 5418 |
| Chromoionophore VIII | 3',3'',5',5''-Tetrabromophenolphthaleinethyl ester or TBPE |
| Chromoionophore IX | 4-Dibutylamino-4'-(trifluoroacetyl)stilbene or ETH 4003 |
| Chromoionophore X | 4-Dioctylamino-4'-(trifluoroacetyl)stilbene or ETH 4004 |
| Chromoionophore XI | Fluorescein octadecyl ester or ETH 7061 |
| Chromoionophore XVII | 1-Hydroxy-4-[4-(2-hydroxyethylsulfonyl)phenylazo]naphthalene-2-sulfonic acid potassium salt or GJM-541 |

The ion-selective ionophore can be selected such that it can complex the targeted ion with a binding constant which is several thousand times higher than the binding constants between the ionophore and other species present in the medium. In some embodiments, the composite material can be used as an ion-specific sensor for the specific detection of a chemical species having a higher affinity with the ion-selective ionophore compared to other species present in the medium. The ion-selective ionophore may therefore be selected to selectively bind the targeted ion over other ions or compounds present in the medium. In some embodiments, the ion-selective ionophore includes aluminium ionophore-I, ammonium ionophore-I, cadmium ionophore-I, calcium ionophore-I, calcium ionophore-II, -calcium ionophore-III, calcium ionophore-IV, calcium ionophore-V, calcium ionophore-VI, cerium(III) ionophore-I, cesium ionophore-I, cesium ionophore-II, cesium ionophore-III, chromium(III) ionophore-III, chromium(IV) ionophore-III, cobalt ionophore-IV, copper(II) ionophore-I, copper(II) ionophore-IV, copper(II) ionophore-V, erbium ionophore-IV, hydrogen ionophore-I, hydrogen ionophore-II, hydrogen ionophore-III, hydrogen ionophore-IV, hydrogen ionophore-V, Iron(III) ionophore-IV, lead ionophore-I, lead ionophore-II, lead ionophore-III, lead ionophore-IV, lead ionophore-VII, lithium ionophore-I, lithium ionophore-II, lithium ionophore-III, lithium ionophore-IV, lithium ionophore-VI, lithium ionophore-VII, lithium ionophore-VIII, magnesium ionophore-I, magnesium ionophore-II, magnesium ionophore-III, magnesium ionophore-IV, magnesium ionophore-VI, magnesium ionophore-VII, mercury ionophore-I, potassium ionophore-I, potassium ionophore-II, potassium ionophore-III, potassium ionophore-IV, rubidium ionophore-I, samarium ionophore-I, samarium ionophore-II, silver ionophore-III, silver ionophore-IV, silver ionophore-VI, silver ionophore-VII, sodium ionophore-I, sodium ionophore-II, sodium ionophore-III, sodium ionophore-IV, sodium ionophore-V, sodium ionophore-VI, sodium ionophore-VIII, sodium ionophore-X, thulium ionophore-I, tin ionophore-I, uranyl ionophore-I, ytterbium(III) ionophore-II, zinc ionophore-I, zirconium ionophore-I, benzoate ionophore-I, carbonate ionophore-VII, chloride ionophore-I, chloride ionophore-II, chloride ionophore-III, chloride ionophore-IV, cyanide ionophore-II, fluoride ionophore-I, hydrogen sulfite ionophore-I, iodide ionophore-I, iodide ionophore-IV, molybdate ionophore-I, nitrate ionophore-III, nitrate ionophore-V, nitrate ionophore-VI, nitrite ionophore-I, nitrite ionophore-II, perchlorate ionophore-I, phtalate ionophore-I, salicylate ionophore-I, salicylate ionophore-II, sulfate ionophore-I, or amine ionophore-I.

Due to the electroneutrality of the composite material, the number of cations/anions that can enter into the composite material is lower than the concentration of the respective ionic additive R. In turn, the ionophore L can modulate the selectivity of the ionic exchange provided by the ionic additive R, by means of reversible selective binding/complexation of the ion to be detected. The concentration of the ion-selective ionophore can be selected to be higher than that of the ionic sites to provide a predominantly complexation-determined selectivity for the composite material. Furthermore, it is understood that the ion-selective ionophore should not be selective to the exchangeable counterion of the ionic additive R. In some embodiments, the counterion of the ionic additive R can be exchanged (i.e., replaced) with a second counterion by conditioning of the composite material. The conditioning can for example include soaking the composite material in a solution which has a high concentration of the second counterion.

In some embodiments, the composite material aims at detecting ions (i.e. targeted ions), and the chemical indicator includes the chromoionophore C, the ion-selective ionophore L and the ionic additive R. The chemical indicator allows for:
the transport of the targeted ions in the composite material at temperatures below the Tg;
the complexation of the targeted ions by the ion-selective ionophore, in the composite material, the ion-selective ionophore thereby releasing a stimulus, such as a proton, as a result; and
a change in the optical response of the composite material via a change of the chemical state of the chromoionophore (e.g. protonated chromoionophore).

It is understood that the term "optical response", as used herein, may refer to changes in the interaction of the composite material with light as a result of the presence of the transported targeted ions. This optical response can therefore be monitored by observing or measuring the spectral properties of the composite material. In some applications, such a monitoring can provide a qualitative indication of the presence of targeted ions within the composite material. For example, the presence of the targeted ions may alter the perceived color of the composite material. By way of example, a sodium-sensitive membrane made from a composite material according to one embodiment may appear light blue when immersed in a sodium-free solution, and may appear dark purple when immersed in a solution containing a sufficient concentration of NaCl. In other implementations, a change in refractive index, and/or in the optical absorption and/or the reflection or emission spectrum of the composite material may be induced upon exposure to the chemical species. Such a change may be detected by known techniques, based for example on absorption spectroscopy, reflectance spectroscopy or evanescent-wave spectroscopy. An example of an evanescent-wave spectroscopic technique may for example be found in U.S. Pat. No. 7,864,321 (CARON et al.).

In some implementations, spectroscopy techniques may provide a quantitative indication of the concentration of the targeted ions present in a solution. For example, a given chromoionophore may co-exist in the composite material in neutral and acidic forms, the relative proportions of these forms being directly related to the concentration of targeted ions transported through the composite material, and therefore to the concentration of the target chemical species in the solution. As chromoionophores in each form has an optical response characterized by a distinct spectral shape, the resulting spectral response of the composite material will be a combination of these two distinct spectra weighted by the ratio of chromoionophores in neutral and acidic forms. This ratio can be determined by analyzing the spectral response, and the concentration of targeted ions calculated using an equation describing the equilibrium between the chromoionophore C, ionophore L, ionic site R and targeted ion.

In some embodiments, the composite material described herein is used in a chemical sensor. The chemical sensor can be an ion-selective sensor, such as an anion-selective sensor or a cation-selective sensor. In some embodiments, the chemical sensor is an optical fiber chemical sensor. The composite material may be deposited at an extremity of the fiber, for direct sensing, or may define a sensing cladding that surrounds the core of the optical fiber, for evanescent-wave sensing.

In some embodiments, the composite material is used in a chemical sensor for sensing sodium ions. The composite material exhibits an optical response which varies with the concentration of sodium ions present in the composite material. An optical system can be used for monitoring the optical response and quantifying the concentration of the sodium ions present in an aqueous solution.

It will be readily understood that the monitoring of the optical response of the composite material may be performed in a variety of manners according to the requirements and preferences of specific applications. Such a monitoring may be quantitative or qualitative, manual or automatized, etc.

One possible application of the composite material is the quantitative measurement of ion concentrations in adverse environmental conditions. For example, measurements may be carried out at temperatures between 80° C. and 350° C. in certain circumstances/applications. In some scenarios, the composite material can perform ion-selective measurements from room temperature up to at least the glass transition temperature of the polymer.

A method for manufacturing the composite material is provided. The method includes mixing together the porosity promoter, the polymer, and the chemical indicator. Each one of the polymer, porosity promoter and components of the chemical indicator can be solubilized or suspended in a solvent, in any suitable order, prior to mixing. It should be understood that the polymer, porosity promoter and each separate component of the chemical indicator can be mixed sequentially in any order or together in a single step, so as to obtain the solution or suspension. The mixing can include ultrasonic mixing, carried out for example in an ultrasonic bath, and/or mechanical mixing. In some embodiments, using a combination of ultrasonic and mechanical mixing allows obtaining a substantially homogeneous composite material. It should be understood that the mixing can be carried out by other means, and that a composite material that is somewhat heterogeneous can be suitable in certain applications. The method also includes a solvent removal step, which allows obtaining the composite material. The solvent removal step can include evaporating the solvent under vacuum and/or heating of the solvent.

In some embodiments, the method includes the steps of:
solubilizing or suspending the polymer, porosity promoter and chemical indicator in a solvent in order to obtain a solution or a suspension;
mixing the solution or suspension; and
removing the solvent, thereby obtaining the composite material.

It should be understood that the scope of the appended claims should not be construed as being limited by the embodiments described herein, but should be given the broadest interpretation consistent with the description as a whole.

EXAMPLES

Example 1 (Preparation of Composite Materials)

Experiments were performed to prepare composite materials A, B, C, D, E and F, sensitive to $H^+$ and to sodium cations.

Composite Material A

Composite material A was prepared by mixing mesoporous silica powder (SBA-15 type, SSA=600 $m^2/g$) with a solution of fluorinated polyimide of formula (Ic) in tetrahydrofuran (THF), using an ultrasonic bath and mechanical mixing. Then, a pH-sensitive dye (Chromoionophore I), a sodium-selective ionophore (Na ionophore X) and an ionic additive (Sodium tetrakis[3,5-bis(trifluoro)phenyl]borate) in THF were added to the mixture. The solution obtained this way was mixed, and the solvent evaporated to obtain the composite material A. The Tg of the fluorinated polyimide of formula (Ic) was measured to be 255° C.

The amount of starting material used to prepare the composite material A was as follows:
3.489 mg of mesoporous silica SBA-15;
100 μL of polyimide solution (89.275 mg/1 mL THF); and
160 μL of sodium-sensitive cocktail solution containing (for 1 mL of THF):
2.072 mg of Sodium ionophore X;
0.301 mg of Chromoionophore I; and
1.565 mg of Sodium tetrakis[3,5-bis(trifluoro)phenyl]borate.

13 mg of the composite material A was obtained as a light blue solid membrane. Composite material A had a 71.9/28.1 polymer/porosity promoter ratio and 135 nmol of ionic additive per square meter specific surface area (SSA) of the unfunctionalized porosity promoter.

Composite Material B

Composite material B was prepared by mixing mesoporous silica powder (SBA-15 type) with a solution of fluorinated polyimide solution of formula (Ic) in tetrahydrofuran (THF), using ultrasonic bath and mechanical mixing. Then, a pH-sensitive dye (Chromoionophore VII), a sodium-selective ionophore (Na ionophore X) and an ionic site (Sodium tetrakis[3,5-bis(trifluoro)phenyl]borate) in THF were added to the mixture. The solution obtained this way was mixed, and the solvent evaporated to obtain the composite material B.

The amount of starting material used to prepare the composite material B was as follows:
3.549 mg of mesoporous silica SBA-15;
100 μL of polyimide solution (89.275 mg/1 mL THF); and
160 μL of sodium-sensitive cocktail solution containing (for 1 mL of THF):
1.980 mg of Sodium ionophore X;
0.401 mg of Chromoionophore VII; and
1.623 mg of Sodium tetrakis[3,5-bis(trifluoro)phenyl]borate.

13 mg of the composite material B was obtained as a light blue, solid membrane. Composite material B had a 71.6/28.4 polymer/porosity promoter ratio and 138 nmol of ionic additive per square meter specific surface area (SSA) of the unfunctionalized porosity promoter.

Composite Material C

Composite material C was prepared by mixing mesoporous silica powder (SBA-15 type) with a solution of fluorinated polyimide solution of formula (Ic) in tetrahydrofuran (THF), using ultrasonic bath and mechanical mixing. Then, a pH-sensitive dye (Chromoionophore I), a sodium-selective ionophore (Na ionophore X) and an ionic site (Sodium tetrakis[3,5-bis(trifluoro)phenyl]borate) in THF were added to the mixture. The solution obtained this way was mixed, and the solvent evaporated to obtain the composite material C.

The amount of starting material used to prepare the composite material C was as follows:
3.001 mg of mesoporous silica SBA-15;
100 μL of polyimide solution (45.007 mg/1 mL THF); and
140 μL of sodium-sensitive cocktail solution containing (for 1 mL of THF):
2.072 mg of Sodium ionophore X;
0.301 mg of Chromoionophore I; and
1.565 mg of Sodium tetrakis[3,5-bis(trifluoro)phenyl]borate.

8 mg of the composite material C was obtained as a light blue, solid membrane. Composite material C had a 60/40 polymer/porosity promoter ratio and 142 nmol of ionic additive per square meter specific surface area (SSA) of the unfunctionalized porosity promoter.

Composite Material D

Composite material D was prepared by mixing mesoporous silica powder (MCM-41 type, SSA=900 $m^2/g$) with a solution of fluorinated polyimide solution of formula (Ic) in tetrahydrofuran (THF), using ultrasonic bath and mechanical mixing. Then, a pH-sensitive dye (Chromoionophore I), a sodium-selective ionophore (Na ionophore X) and an ionic site (Sodium tetrakis[3,5-bis(trifluoro)phenyl]borate) in THF were added to the mixture. The solution obtained this way was mixed, and the solvent evaporated to obtain the composite material D.

The amount of starting material used to prepare the composite material D was as follows:
3.004 mg of mesoporous silica MCM-41;
200 μL of polyimide solution (44.625 mg/1 mL THF); and
200 μL of sodium-sensitive cocktail solution containing (for 1 mL of THF):
2.072 mg of Sodium ionophore X;
0.301 mg of Chromoionophore I; and
1.565 mg of Sodium tetrakis[3,5-bis(trifluoro)phenyl]borate.

12.7 mg of the composite material D was obtained as a light blue, solid membrane. Composite material D had a 74.8/25.2 polymer/porosity promoter ratio and 136 nmol of ionic additive per square meter specific surface area (SSA) of the unfunctionalized porosity promoter.

Composite Material E

Composite material E was prepared by mixing mesoporous silica powder (MSU-F, SSA=562 $m^2/g$) with a solution of fluorinated polyimide solution of formula (Ic) in tetrahydrofuran (THF), using ultrasonic bath and mechanical mixing. Then, a pH-sensitive dye (Chromoionophore I), a sodium-selective ionophore (Na ionophore X) and an ionic site (Sodium tetrakis[3,5-bis(trifluoro)phenyl]borate) in THF were added to the mixture. The solution obtained this way was mixed, and the solvent evaporated to obtain the composite material E.

The amount of starting material used to prepare the composite material E was as follows:
- 3.450 mg of mesoporous silica MSU-F;
- 200 µL of polyimide solution (44.625 mg/1 mL THF); and
- 140 µL of sodium-sensitive cocktail solution containing (for 1 mL of THF):
  - 2.072 mg of Sodium ionophore X;
  - 0.301 mg of Chromoionophore I; and
  - 1.565 mg of Sodium tetrakis[3,5-bis(trifluoro)phenyl]borate.

12.9 mg of the composite material E was obtained as a light pink, solid membrane. Composite material E had a 72.1/27.9 polymer/porosity promoter ratio and 132 nmol of ionic additive per square meter specific surface area (SSA) of the unfunctionalized porosity promoter.

Composite Material F

Composite material F was prepared by mixing mesoporous silica powder (SBA-15 type) with a solution of fluorinated polyimide solution of formula (Ic) in tetrahydrofuran (THF), using ultrasonic bath and mechanical mixing. Then, a pH-sensitive dye (Chromoionophore I), a sodium-selective ionophore (Na ionophore X) and an ionic site (Sodium tetrakis[3,5-bis(trifluoro)phenyl]borate) in THF were added to the mixture. The solution obtained this way was mixed, and the solvent evaporated to obtain the composite material F.

The amount of starting material used to prepare the composite material F was as follows:
- 3.170 mg of mesoporous silica SBA-15;
- 250 µL of polyimide solution (63.272 mg/0.5 mL THF); and
- 150 µL of sodium-sensitive cocktail solution containing (for 1 mL of THF):
  - 2.011 mg of Sodium ionophore X;
  - 0.303 mg of Chromoionophore I; and
  - 0.829 mg of Sodium tetrakis[3,5-bis(trifluoro)phenyl]borate.

35 mg of the composite material F was obtained as a light blue, solid membrane. Composite material F had a 90.9/9.1 polymer/porosity promoter ratio and 74 nmol of ionic additive per square meter specific surface area (SSA) of the unfunctionalized porosity promoter.

Example 2 (Response of Composite Material A to pH Change)

Experiments were conducted to measure the response of the composite material A to pH change.

Composite material A was immersed in an HCl solution at pH=2 for several minutes at 70° C. The solution did not contain sodium ions. The material remained light blue.

Composite material A was immersed in a KOH solution at pH=13 for several minutes at 70° C. The solution did not contain sodium ions. The material became dark purple.

In each case, the diffuse reflectance R was measured using an Agilent Cary™ 7000 Universal Measurement Spectrophotometer equipped with an external diffuse reflectance accessory.

Figure 1:
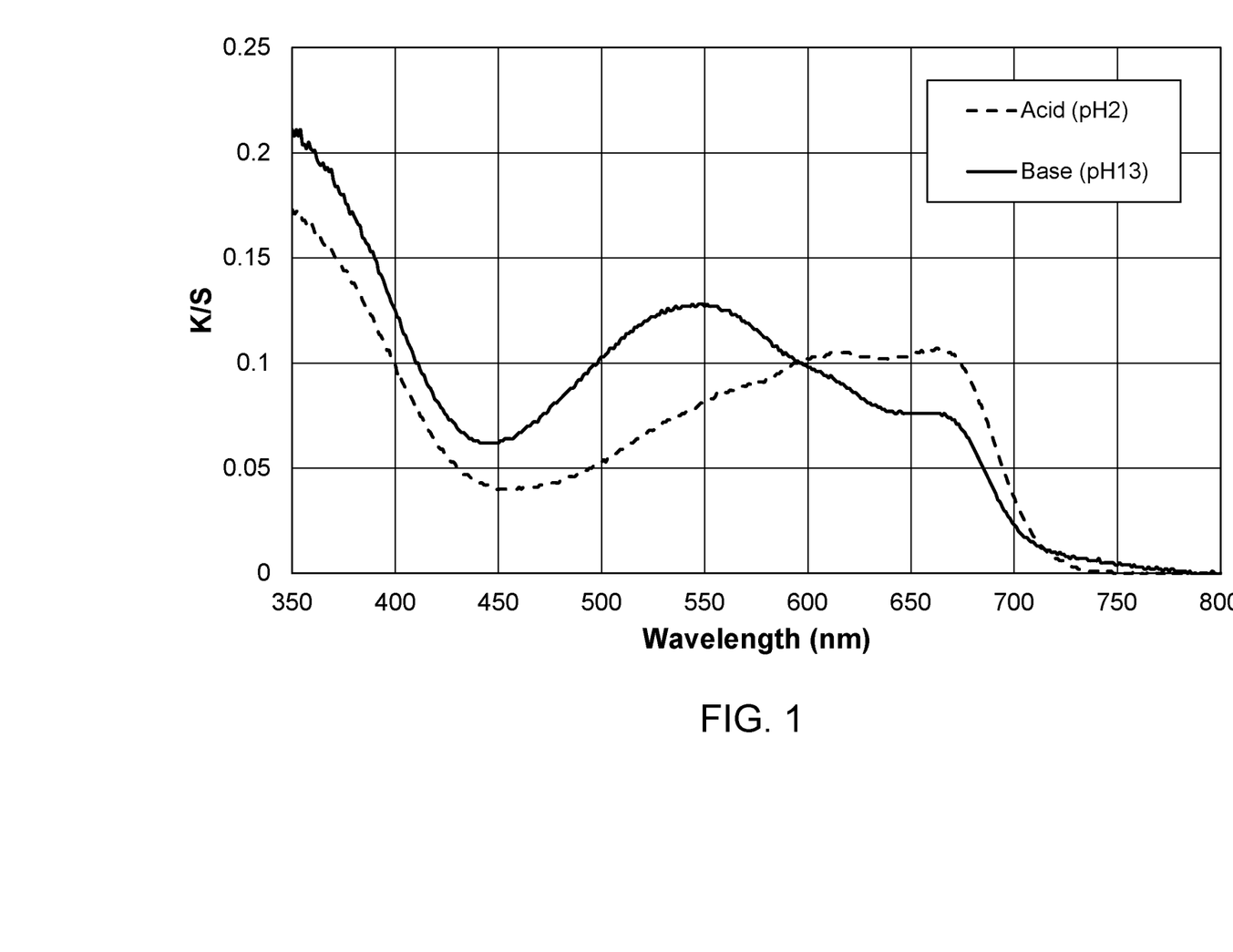
FIG. 1 is a series of plots showing the ratio K/S as a function of the wavelength for composite material A, under acidic (pH=2, HCl solution) and basic (pH=13, KOH solution) conditions.

FIG. 1 shows plots of the ratio K/S as a function of the wavelength for the composite material A, under acidic (pH=2, HCl solution) and basic (pH=13, KOH solution) conditions, where K is the molar absorption coefficient of the composite material A, and S is the scattering coefficient of the composite material A. The spectra were acquired after immersion of the composite material at 70° C.

The plots were obtained using the Kubelka-Munk equation below, where R is the measured diffuse reflectance of the composite material A:

$$\frac{K}{S} = \frac{(1-R)^2}{2R}$$

A factor analysis (as described in Malinowski, E. R., *Factor Analysis in Chemistry*, John Wiley & Sons, New York, 1991) of the matrix generated by these spectra showed that all intermediate spectra could be reproduced using the same two eigenvectors, i.e., the spectral components associated with the acid state and basic state of the dye.

Example 3 (Response of Composite Material A to pH Change)

Experiments were conducted to measure the response of composite material A to pH change, when immersed in a buffer solution (TRIS: 2-Amino-2-(hydroxymethyl)-1,3-propanediol).

Composite material A was immersed in a buffer solution for several minutes at 70° C., at various pH values between 7 and 13.2. The buffer solution did not contain sodium ions. For each pH value, the diffuse reflectance was measured as described in Example 2, and the ratio of deprotonation α of the dye inside the membrane was calculated by classical least square linear regression.

Figure 2:
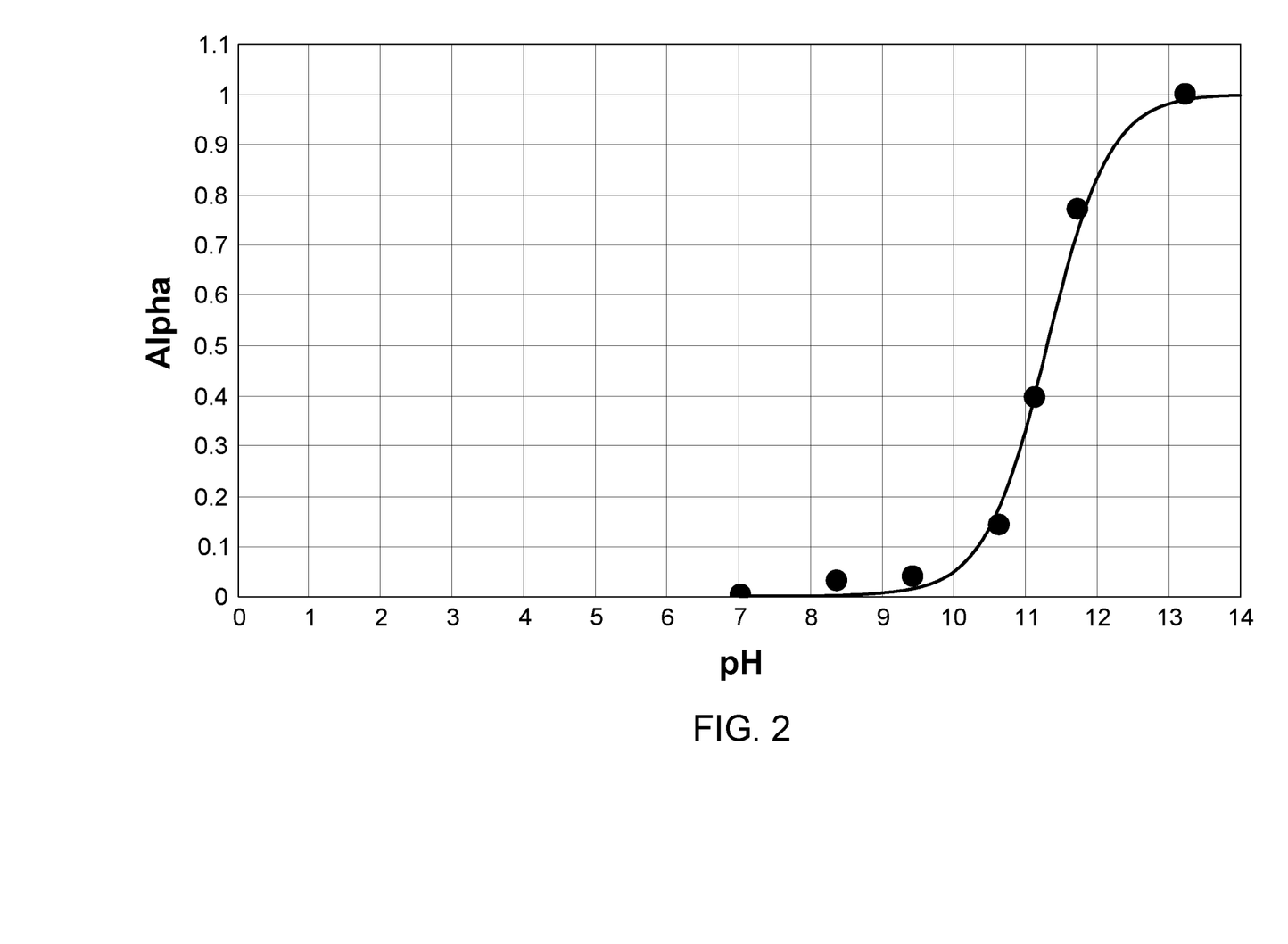
FIG. 2 is a plot of the ratio of deprotonation $\alpha$ as a function of the pH, for composite material A.

FIG. 2 is a plot of α as a function of the pH for composite material A.

The pKa of the composite material A was found to be 11.3. It is noted that this plot can be used as a calibration curve for determining the pH of an aqueous solution which does not contain sodium ions, by monitoring the optical response of the composite material.

Example 4 (Response of Composite Material B to pH Change)

Experiments were conducted to measure the response of composite material B to pH change, when immersed in a buffer solution (TRIS: 2-Amino-2-(hydroxymethyl)-1,3-propanediol).

Composite material B was immersed in a buffer solution for several minutes at 50° C., at various pH values between 1 and 10.4. The buffer solution did not contain sodium ions. For each pH value, the diffuse reflectance was measured as described in Example 2, and the ratio of deprotonation α of the dye inside the membrane was calculated as in Example 3.

Figure 3:
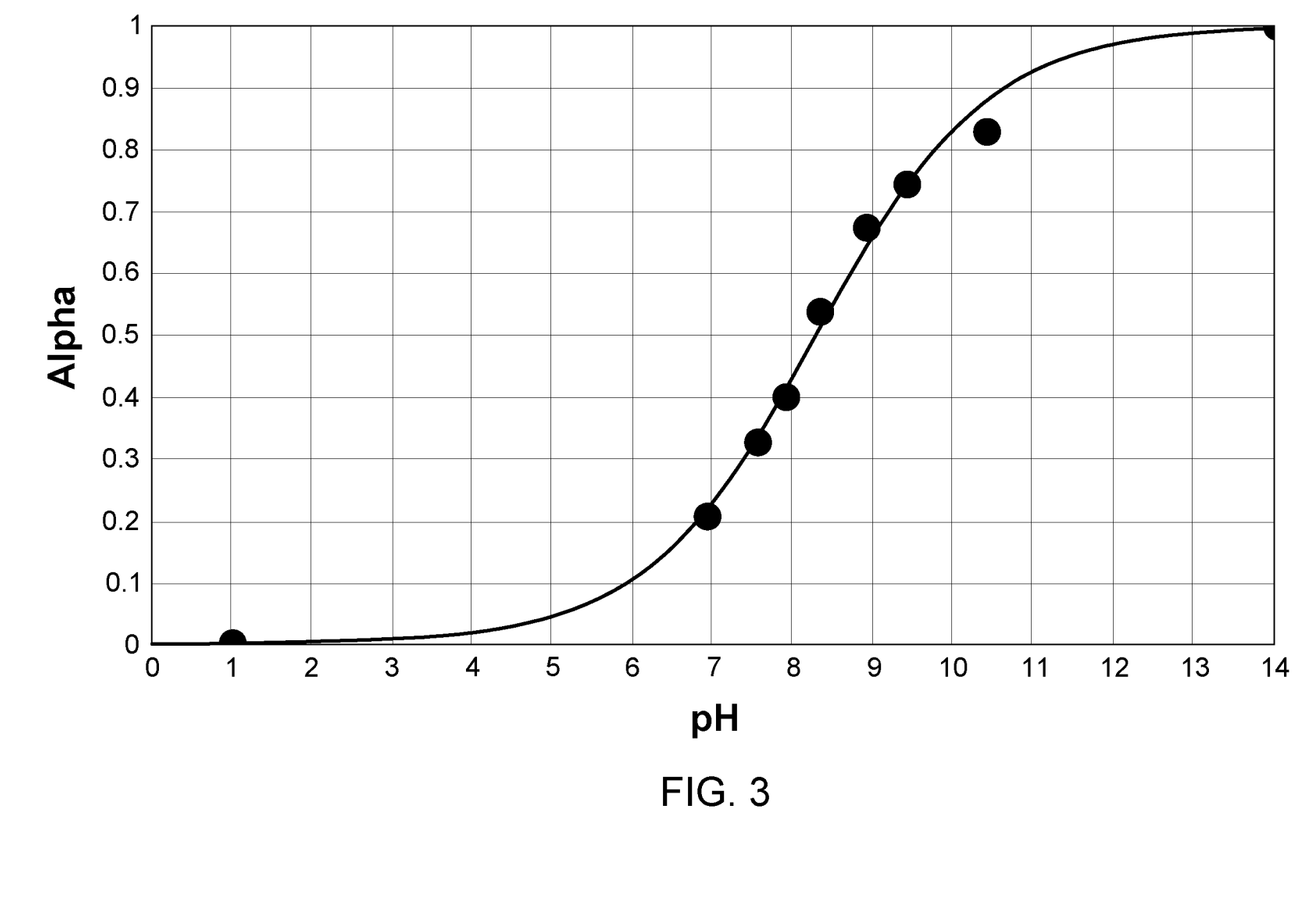
FIG. 3 is a plot of the ratio of deprotonation $\alpha$ as a function of the pH, for composite material B.

FIG. 3 is a plot of α as a function of the pH for composite material B.

The pKa of the composite material B was found to be 8.3. It is noted that this plot can be used as a calibration curve for determining the pH of an aqueous solution which does not contain sodium ions, by monitoring the optical response of the composite material.

Example 5 (Response of Composite Material A to Sodium Ions)

Experiments were conducted to observe the response of composite materials A to sodium ions, at various temperatures.

Composite material A was immersed in a buffer solution (TRIS: 2-Amino-2-(hydroxymethyl)-1,3-propanediol) at pH=9.00, which did not contain sodium ions, at 25° C., 50° C., 70° C., 90° C. and 100° C. Composite material A retained the light blue coloration at all temperatures tested. It is noted that these results are coherent with the plot of FIG. 2 at this pH value.

Composite material A was immersed in a buffered aqueous NaCl (0.1M) solution (TRIS: 2-Amino-2-(hydroxymethyl)-1,3-propanediol)) at pH=9.00, at 25° C., 50° C., 70° C., 90° C. and 100° C. After several minutes of immersion, composite material A became dark purple at all temperatures tested. This shows that sodium ions are transported from the NaCl solution to inside the membrane, across a large temperature range, which is under the Tg of the polymer of formula (Ic).

Example 6 (Response of Composite Material A to Sodium Ions)

Experiments were conducted to measure the response of composite material A to a sodium concentration change. The measurements were conducted at pH=9.00 after immersion of composite material A in NaCl solutions of various concentrations (between $10^{-6}$ M and 0.75 M), at 70° C.

For each value of sodium concentration, the diffuse reflectance was measured as described in Example 2, and the ratio of deprotonation α of the dye inside the membrane was calculated as in Example 3.

Figure 4:
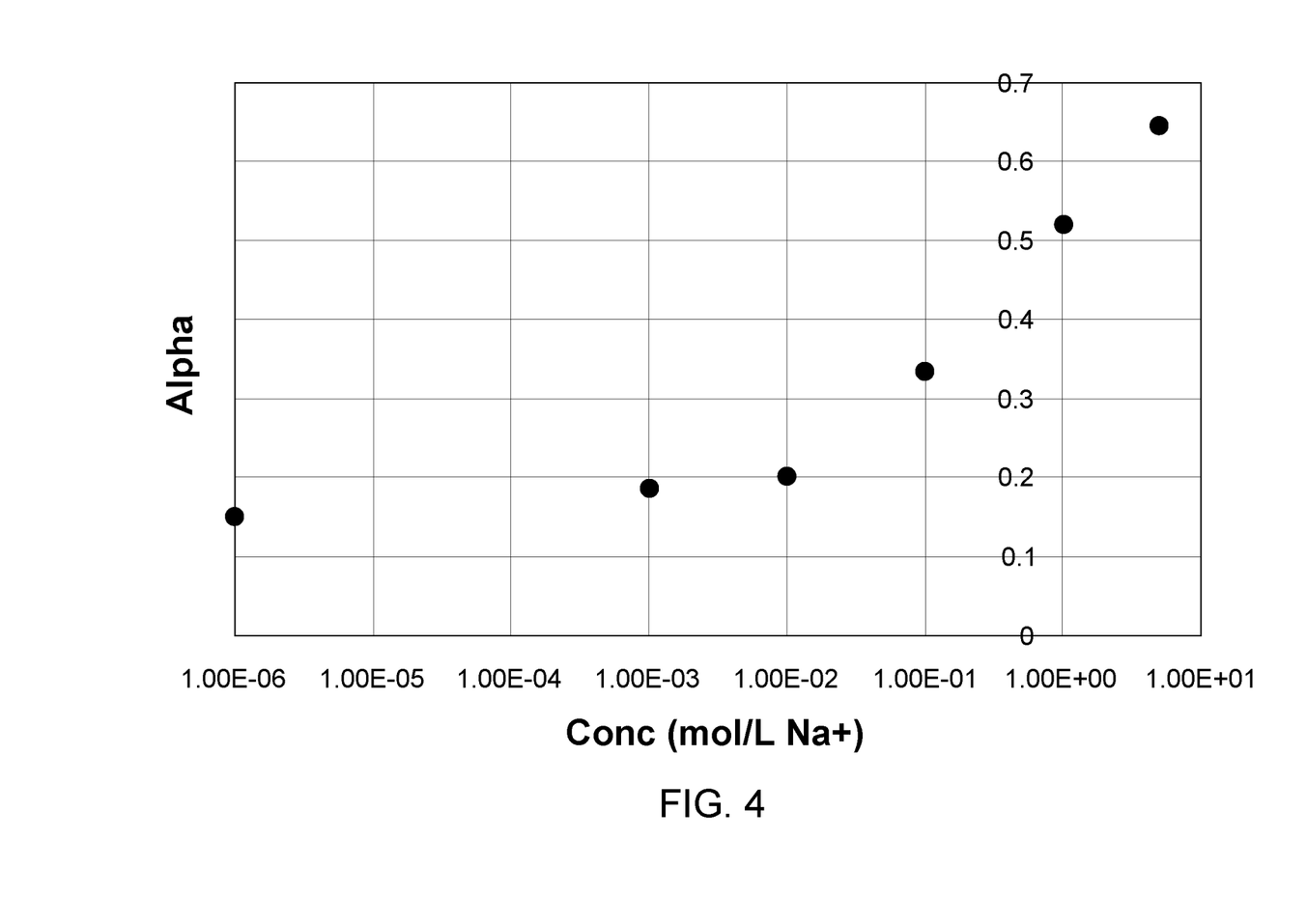
FIG. 4 is a plot showing the ratio of deprotonation $\alpha$ as a function of the sodium concentration, for composite material A.

FIG. 4 is a plot showing the value of α as a function of the sodium concentration. This shows that the sodium concentration of a medium can be measured by monitoring the optical response of the composite material.

Example 7 (Response of Composite Material C to pH Change)

Experiments were conducted to measure the response of composite material C to pH change, when immersed in different aqueous solutions.

Light blue composite material C was immersed in a basic solution (pH=13, potassium hydroxide) at 25° C. After several minutes (less than 5), composite material turn to dark purple. This dark purple composite material C was immersed in an acid solution (pH=1, hydrochloric acid) at 25° C. After several minutes (less than 5), composite material turn back to light blue.

Example 8 (Response of Composite Material C to Sodium Ions)

Composite material C was immersed in a buffer solution (TRIS: 2-Amino-2-(hydroxymethyl)-1,3-propanediol) which did not contain sodium ions, at pH=9.00 and 50° C. Composite material C retained the light blue coloration at 50° C. in the buffer solution.

Composite material C was immersed in a buffered aqueous NaCl (1M) solution of [TRIS: 2-Amino-2-(hydroxymethyl)-1,3-propanediol)] at pH=9.00 and 50° C. After several minutes of immersion, composite material C became dark purple. This shows that sodium ions are transported from the NaCl solution to inside the membrane, at a temperature which is under the Tg of the polymer of formula (Ic).

Example 9 (Response of Composite Material D to pH Change)

Experiments were conducted to measure the response of composite material D to pH change, when immersed in different aqueous solutions.

Light blue composite material D was immersed in a basic solution (pH=13, potassium hydroxide) at 50° C. After several minutes (less than 5), composite material D turn to dark purple. This dark purple composite material D was immersed in an acid solution (pH=1, Hydrochloric acid) at 50° C. After several minutes (less than 5), composite material D turn back to light blue.

Example 10 (Response of Composite Material E to pH Change)

Experiments were conducted to measure the response of composite material E to pH change, when immersed in different aqueous solutions.

Light blue composite material E was immersed in a basic solution (pH=13, potassium hydroxide) at 50° C. After several minutes (less than 5), composite material E turn to dark purple. This dark purple composite material E was immersed in a acid solution (pH=1, Hydrochloric acid) at 50° C. After several minutes (less than 5), composite material E turn back to light blue.

Example 11 (Response of Composite Material F to pH Change by Vapor)

Experiments were conducted to measure the response of composite material F to pH change, when exposed to different vapors of gaseous acid or base.

Light blue composite material F was exposed to basic vapor, i.e. above the surface a concentrated solution of aqueous ammoniac ($NH_3$ in $NH_4OH$) at room temperature. After several seconds (less than 1 minute), composite material E turn to dark purple.

Dark purple composite material F was exposed to acidic vapor, i.e. above the surface of a concentrated solution of hydrochloric acid (HCl in water) at room temperature. After several seconds (less than 1 minute), composite material E turn to light blue.

The invention claimed is:
1. A cation-selective sensor for sensing cations solvated in a solution, the cation-selective sensor comprising:
   a diffuse reflectance detector; and
   a composite material, the composite material comprising:
   a polymer material having a glass transition temperature (Tg), wherein the polymer material is a homopolymer selected from the group consisting of a polyimide, a polyether ketone, a polyacrylate, a poly-etherimide, a polyacrylamide, a polyamide-imide, a polysulfone, a polyethersulfone, a polynorbornene, and a polyurethane;
   a porosity promoter which is an unfunctionalized mesoporous oxide, the porosity promoter being dispersed in the polymer material in an amount such that the cation is transportable from the solution into the composite material at a temperature below the Tg; and
   a chemical indicator comprising an ionic additive, a chromoionophore and an ion-selective ionophore, the chemical indicator being dispersed in the composite material and providing an optical response, the optical response being a variation of diffuse reflectance as a function of a concentration of the cations in the composite material, wherein the chemical indicator comprises at least 130 nmol of ionic additive per square meter specific surface area (SSA) of the porosity promoter, and wherein the porosity promoter and the polymer material are present in the composite material in a ratio polymer material/porosity promoter between 80/20 and 50/50 (w/w), the composite material being substantially homogeneous and porous.

2. The cation-selective sensor of claim 1, wherein the solution is an aqueous solution.

3. The cation-selective sensor of claim 2, wherein the cations comprise sodium cations.

4. The cation-selective sensor of claim 1, wherein the porosity promoter is substantially non-reactive to the polymer material.

5. The cation-selective sensor of claim 1, wherein the Tg is higher than 150° C.

6. The cation-selective sensor of claim 1, wherein the polymer material comprises a polyimide of general formula I:

(I)

wherein:
A is a tetravalent linker, which is:
   a substituted or unsubstituted, saturated, unsaturated or aromatic monocyclic or polycyclic group having 5 to about 50 carbon atoms; or
   a group of general formula:

wherein:
   each $A_1$ is independently a substituted or unsubstituted, saturated, unsaturated or aromatic monocyclic or polycyclic group having 5 to about 50 carbon atoms, and
   W is a bond, —O—, —$CR_3R_4$—, —$NR_5$—, —S—, —(CO)—, arylene, or substituted arylene; and
Z is —$(CR_3R_4)_m$—, arylene, or substituted arylene; or
Z is of general formula:

wherein:
   each $Z_1$ is independently arylene or substituted arylene;
   each X is independently a bond, —O—, —$CR_3R_4$—, —S—, —(CO)—, arylene, or substituted arylene;
   each $R_3$, $R_4$ and $R_5$ is independently: H, a ($C_1$-$C_4$) alkyl or a substituted ($C_1$-$C_4$)alkyl;
and
   n is from 1 to 16.

7. The cation-selective sensor of claim 1, wherein the polymer material comprises a polyimide of general formula (Ib):

(Ib)

wherein:
   each X is independently: —O— or —$CR_3R_4$—;
   n is 1, 2 or 3; and
   $R_3$ and $R_4$ are $CF_3$.

8. The cation-selective sensor of claim 1, wherein the polymer material comprises a polyimide of Formula (Ic):

(Ic)

9. The cation-selective sensor of claim 1, wherein the polymer material comprises a polyimide of Formula (Id):

(Id)

10. The cation-selective sensor of claim 1, wherein the unfunctionalized mesoporous oxide comprises mesoporous silica, mesoporous alumina, a mesoporous oxide of niobium, a mesoporous oxide of tantalum, a mesoporous oxide of titanium, a mesoporous oxide of zirconium, a mesoporous oxide of cerium, a mesoporous oxide of tin or a mixture thereof.

11. The cation-selective sensor of claim 1, wherein the unfunctionalized mesoporous oxide comprises MCM-41, SBA-15, MSU, KSW, FSM, HAM or a mixture thereof.

12. The cation-selective sensor of claim 1, wherein the ratio polymer material/porosity promoter is between 80/20 and 60/40 (w/w).

13. The cation-selective sensor of claim 1, wherein the ratio polymer material/porosity promoter is between 70/30 and 50/50 (w/w).

14. The cation-selective sensor of claim 1, wherein the ionic additive comprises Sodium tetrakis[3,5-bis(trifluoro)phenyl]borate (NaTFPB), potassium tetrakis[3,5-bis(trifluoromethyl)phenyl]borate, sodium tetrakis[3,5-bis(1,1,1,3,3,3-hexafluoro-2-methoxy-2-propyl)phenyl]borate trihydrate, potassium tetrakis(4-chlorophenyl)borate, potassium tetrakis(4-biphenylyl)borate, potassium tetrakis(4-tert-butylphenyl)borate, sodium tetra(p-tolyl)borate, sodium tetrakis(4-fluorophenyl)borate dihydrate, sodium tetraphenylborate, tetradodecylammonium tetrakis(4-chlorophenyl)borate, tetraheptylammonium tetraphenylborate, tetraphenylphosphonium tetraphenylborate, sodium tetrakis[3,5-bis(tridecafluorohexyl)phenyl]borate, 1,2-dimethyl-3-nitrobenzene, dimethyldioctadecylammonium bromide, tridodecylmethylammonium chloride, tetraoctyl ammonium bromide, tetraoctadecylammonium bromide, hexadecyltrimethylammonium bromide, tridodecylmethylammonium nitrate, or a mixture thereof.

15. The cation-selective sensor of claim 1, wherein the chemical indicator comprises between 130 nmol and 270 nmol of ionic additive per square meter SSA of the porosity promoter.

16. The cation-selective sensor of claim 1, wherein the chromoionophore comprises chromoionophore-I, chromoionophore-II, chromoionophore-III, chromoionophore-IV, chromoionophore-V, chromoionophore-VI, chromoionophore-VII, chromoionophore-VIII, chromoionophore-IX, chromoionophore-X, chromoionophore-XI, chromoionophore-XVII, 10-[3-(dansylamino)propyl]-1,4,7-trithia-10-azacyclododecane, 4-(dioctylamino)-4'-(trifluoroacetyl)azobenzene, 7-[3-(dansylamino)propyl]-1-oxa-4,10-dithia-7azacyclododecane or octadecyl2-(4-dipropylaminophenylazo)benzoate.

17. The cation-selective sensor of claim 1, wherein the ion-selective ionophore comprises aluminium ionophore-I, ammonium ionophore-I, cadmium ionophore-I, calcium ionophore-I, calcium ionophore-II, calcium ionophore-III, calcium ionophore-IV, calcium ionophore-V, calcium ionophore-VI, cerium(III) ionophore-I, cesium ionophore-I, cesium ionophore-II, cesium ionophore-III, chromium(III) ionophore-III, chromium(IV) ionophore-III, cobalt ionophore-IV, copper(II) ionophore-I, copper(II) ionophore-IV, copper(II) ionophore-V, erbium ionophore-IV, hydrogen ionophore-I, hydrogen ionophore-II, hydrogen ionophore-III, hydrogen ionophore-IV, hydrogen ionophore-V, Iron(III) ionophore-IV, lead ionophore-I, lead ionophore-II, lead ionophore-III, lead ionophore-IV, lead ionophore-VII, lithium ionophore-I, lithium ionophore-II, lithium ionophore-III, lithium ionophore-IV, lithium ionophore-VI, lithium ionophore-VII, lithium ionophore-VIII, magnesium ionophore-I, magnesium ionophore-II, magnesium ionophore-III, magnesium ionophore-IV, magnesium ionophore-VI, magnesium ionophore-VII, mercury ionophore-I, potassium ionophore-I, potassium ionophore-II, potassium ionophore-III, potassium ionophore-IV, rubidium ionophore-I, samarium ionophore-I, samarium ionophore-II, silver ionophore-III, silver ionophore-IV, silver ionophore-VI, silver ionophore-VII, sodium ionophore-I, sodium ionophore-II, sodium ionophore-III, sodium ionophore-IV, sodium ionophore-V, sodium ionophore-VI, sodium ionophore-VIII, sodium ionophore-X, thulium ionophore-I, tin ionophore-I, uranyl ionophore-I, ytterbium(III) ionophore-II, zinc ionophore-I, zirconium ionophore-I.

18. The cation-selective sensor of claim 1, wherein the optical response comprises a change in the perceivable color of the composite material upon exposure to the cations.

19. A composite material for sensing cations solvated in a solution, the composite material comprising:
   a polymer material having a glass transition temperature (Tg), wherein the polymer material is a homopolymer selected from the group consisting of a polyimide, a polyether ketone, a polyacrylate, a poly-etherimide, a polyacrylamide, a polyamide-imide, a polysulfone, a polyethersulfone, a polynorbornene, and a polyurethane;
   a porosity promoter which is an unfunctionalized mesoporous oxide, the porosity promoter being dispersed in the polymer material in an amount such that the cation is transportable from the solution into the composite material at a temperature below the Tg; and
   a chemical indicator comprising an ionic additive, a chromoionophore and an ion-selective ionophore, the chemical indicator being dispersed in the composite material and providing an optical response, the optical response being a variation of diffuse reflectance as a function of a concentration of the cations in the composite material,
   wherein the chemical indicator comprises at least 130 nmol of ionic additive per square meter specific surface area (SSA) of the porosity promoter, and
   wherein the porosity promoter and the polymer material are present in the composite material in a ratio polymer material/porosity promoter between 80/20 and 50/50 (w/w),
   the composite material being substantially homogeneous and porous.

* * * * *